No. 632,850. Patented Sept. 12, 1899.
A. ROBINSON.
SPRING HINGE.
(Application filed Mar. 4, 1899.)
(No Model.)

Witnesses:
Albert W. Douglas
Charles Overhulser

Inventor:
Albert Robinson

UNITED STATES PATENT OFFICE.

ALBERT ROBINSON, OF ARBELA, MISSOURI.

SPRING-HINGE.

SPECIFICATION forming part of Letters Patent No. 632,850, dated September 12, 1899.

Application filed March 4, 1899. Serial No. 707,816. (No model.)

*To all whom it may concern:*

Be it known that I, ALBERT ROBINSON, a citizen of the United States, residing at Arbela, in the county of Scotland and State of Missouri, have invented a new and useful Spring-Hinge, of which the following is a specification.

My invention relates to improvements in gate-hinges, in which a horizontal rod carrying a coil-spring is attached to a hinge; and the object of my improvement is to afford facilities for the attachment of a coil-spring to a hinge, so that it may close a gate automatically. I attain this object by the mechanism illustrated in the accompanying drawings, in which—

Figure 1:
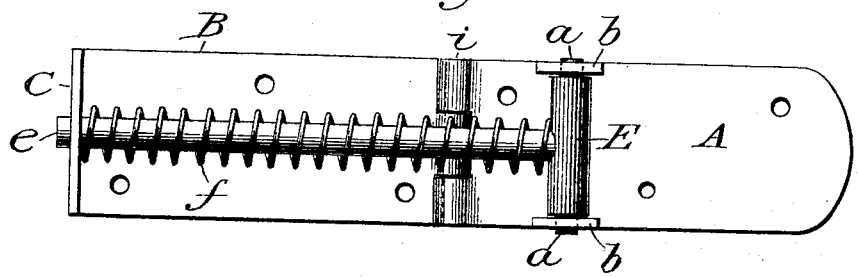
Figure 2:
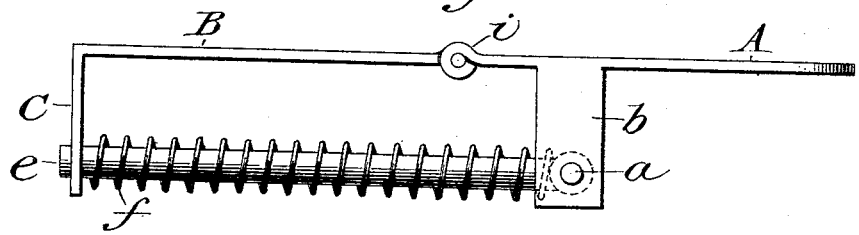
Figure 3:
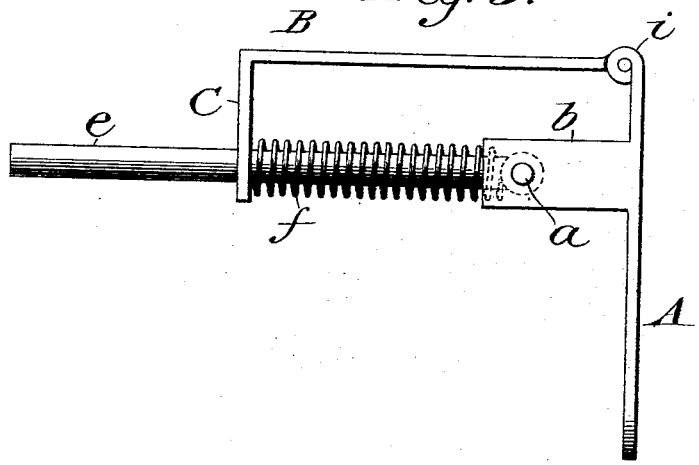

Figure 1 is a front view of the hinge; Fig. 2, a top view when the gate is closed, and Fig. 3 a top view when the gate is standing at an angle of ninety degrees with the fence.

Similar letters refer to similar parts.

The members A B connect by the joint $i$. From the sides of the member A project the arms $b\ b$, which connect by a hinge-joint with the upright E, having the horizontal rod $e$, passing through the coil-spring $f$ and then protruding through the hole in the end of the arm $c$, which is a continuation at an angle of ninety degrees of the member B. The arms $c$ and $b\ b$ are of the same length, so that the member B and the rod $e$ may be parallel when the gate is closed, Figs. 1 and 2, and the distance from the joint $i$ to the center of the arms $b\ b$, where they attach to the member A, is equal to the length of any one of the arms $c$ or $b\ b$, so that the member B and the rod $e$ may be parallel when the gate is standing at an angle of ninety degrees with the fence, Fig. 3.

The member A may be attached to the gate and B to the post, or vice versa. In either instance when the gate is opened the pivots $a\ a$ of the upright E turn in the holes in the arms $b\ b$, the rod $e$ slides in the hole in the arm $c$, the spring $f$ being compressed between the arm $c$, and the upright E closes the gate. It is evident that if the gate be opened to that degree where the upright E reaches a point in the line connecting the joint $i$ and the center of the hole in the arm $c$ the spring expands and tends to throw the gate open.

Having described my invention, what I claim as new, and desire to secure by Letters Patent, is—

In a spring-hinge, the combination, with a hinge formed by the member, A, having arms $b\ b$, and the member B, having arm $c$, of a rod $e$, pivoted at one extremity to the arms $b\ b$, by means of the upright E, and movable longitudinally through a hole in the arm $c$, and the coil-spring $f$, adapted to said rod and compressible between the upright E, and the arm $c$, whereby the gate may be closed as set forth.

ALBERT ROBINSON.

Witnesses:
ALBERT V. DOUGLAS,
CHARLIE OVERHULSER.